(12) United States Patent
Habrich et al.

(10) Patent No.: US 10,920,916 B2
(45) Date of Patent: Feb. 16, 2021

(54) FLUID COUPLING

(71) Applicant: STRATEC Biomedical AG, Birkenfeld (DE)

(72) Inventors: Stephan Habrich, Bad Wildbad (DE); Tuna Sinangin, Karlsruhe (DE); Martin Trump, Pforzheim (DE)

(73) Assignee: STRATEC SE, Birkenfeld (DE)

( * ) Notice: Subject to any disclaimer, the term of this patent is extended or adjusted under 35 U.S.C. 154(b) by 464 days.

(21) Appl. No.: 15/698,937

(22) Filed: Sep. 8, 2017

(65) Prior Publication Data
US 2018/0073671 A1    Mar. 15, 2018

(30) Foreign Application Priority Data
Sep. 12, 2016    (EP) .................................... 16188241

(51) Int. Cl.
| | | |
|---|---|---|
| *F16L 37/36* | (2006.01) | |
| *G01N 35/10* | (2006.01) | |
| *B67D 3/02* | (2006.01) | |
| *B67D 3/00* | (2006.01) | |
| *B01L 3/00* | (2006.01) | |

(52) U.S. Cl.
CPC .............. *F16L 37/36* (2013.01); *B01L 3/563* (2013.01); *B01L 3/567* (2013.01); *B67D 3/0032* (2013.01); *B67D 3/02* (2013.01); *G01N 35/10* (2013.01); *G01N 35/1002* (2013.01); *B01L 2200/025* (2013.01); *B01L 2200/0689* (2013.01); *B01L 2200/143* (2013.01); *B01L 2300/042* (2013.01); *B01L 2300/123* (2013.01); *B01L 2400/0633* (2013.01)

(58) Field of Classification Search
CPC ..... F16L 37/36; B01L 2200/025; G01N 35/10
See application file for complete search history.

(56) References Cited

U.S. PATENT DOCUMENTS

| | | | | |
|---|---|---|---|---|
| 6,079,445 A | * | 6/2000 | Huang | ..................... F16L 37/36 137/614.02 |
| 6,663,144 B1 | * | 12/2003 | Smith, III | ............. E21B 33/038 285/110 |
| 10,435,660 B2 | * | 10/2019 | Seiler | ........................ B01L 9/00 |
| 2001/0052366 A1 | * | 12/2001 | Ozawa | ..................... F16L 37/36 137/614.04 |

(Continued)

FOREIGN PATENT DOCUMENTS

| | | |
|---|---|---|
| DE | 84 29 005 U1 | 4/1985 |
| EP | 2 998 652 A1 | 3/2016 |

(Continued)

*Primary Examiner* — Jonathan M Hurst
(74) *Attorney, Agent, or Firm* — 24IP Law Group USA, PLLC; Timothy DeWitt

(57) ABSTRACT

A fluid coupling for automated analyzer systems suitable to provide liquids to the system, wherein the fluid coupling comprises a stationary part and a movable part for a fluid connection, wherein both parts have a three-part valve for sealing said stationary and movable part against leakage, said three-part valve comprising a first member composed of two rings that are connected by elastic arms, a second member composed of a rod having different diameters on both ends and a third annular member, wherein at least two member of both parts comprise at least one sealing surface and one sealing lip that get in contact for preventing leakage.

18 Claims, 6 Drawing Sheets

(56) References Cited

U.S. PATENT DOCUMENTS

| | | | |
|---|---|---|---|
| 2005/0022883 A1* | 2/2005 | Adams | F16L 37/36 137/614.03 |
| 2007/0212588 A1* | 9/2007 | Kozu | F16L 37/36 429/443 |
| 2008/0185056 A1* | 8/2008 | Diodati | A61M 39/14 137/561 R |
| 2010/0021230 A1* | 1/2010 | Olivier | A61M 39/10 403/11 |
| 2014/0065017 A1* | 3/2014 | Herz | G01N 35/109 422/63 |
| 2015/0167882 A1* | 6/2015 | Von Keitz | B67D 7/3218 137/15.09 |
| 2015/0233509 A1* | 8/2015 | Tiberghien | F16L 37/113 285/119 |
| 2016/0022979 A1* | 1/2016 | Vigna | A61M 39/18 137/15.09 |
| 2016/0296936 A1* | 10/2016 | Trump | G01N 35/1002 |
| 2016/0312939 A1* | 10/2016 | Konishi | F16L 37/18 |
| 2017/0191595 A1* | 7/2017 | Van Scyoc | F16L 37/32 |
| 2018/0045350 A1* | 2/2018 | Van Der Heijden | F16L 37/34 |
| 2018/0142824 A1* | 5/2018 | Gennasio | F16L 37/36 |
| 2018/0364267 A1* | 12/2018 | Shinohara | G01N 35/00732 |
| 2019/0017642 A1* | 1/2019 | Takezawa | B67D 7/54 |

FOREIGN PATENT DOCUMENTS

| | | |
|---|---|---|
| WO | 00/22969 A1 | 4/2000 |
| WO | 2014/057480 A2 | 4/2014 |

\* cited by examiner

FLUID COUPLING

CROSS-REFERENCE TO RELATED APPLICATIONS

The present application claims priority of European Application No. EP 16188241.0 filed on Sep. 12, 2016. The aforementioned application is hereby incorporated by reference in its entirety.

BACKGROUND OF THE INVENTION

Field of the Invention

The present invention relates to a fluid coupling for coupling a container containing a liquid to analyzer systems.

Brief Description of the Related Art

It is necessary to provide liquids of a different nature, e.g. buffer, reagents or substrates as consumables for performing tests or assays in automatic analyser systems. One application for such analyser systems are tests for clinical diagnostics. Thus, containers with consumable liquids have to be coupled to the instruments with tubings and liquid couplings. Often, these couplings have already been integrated into the walls of the containers, but are rather difficult to mate. One solution is to attach an ascending pipe to the lid of the container and a tubing or liquid connector to the pipe.

Known solutions to couple container with consumable liquids to automated analyzer systems are difficult to operate, because the particular connectors have to be aligned and locked. If the mating between the respective parts of the connectors is not done thoroughly, splashes or contaminations may occur.

Another risk during coupling of container is that air may enter the liquid system of an analyzer through an ascending pipe. Such air will have to be removed from the system in a priming operation, so that the process of replacing liquid container will be prolonged.

Sensors detecting fluid presence are usually either located near the ascending pipe with the disadvantage of needing an electrical connector in addition to the fluid connector. Alternatively they can be integrated in the instrument with the disadvantage of being located too far away from the container having a long tubing that can take up a large amount of air volume, that needs to be primed out.

SUMMARY OF THE INVENTION

It is thus an object of the instant invention to improve loading and unloading of liquid containers to analytical systems.

The present invention provides a fluid coupling for automated analyzer systems suitable to provide liquids to the system, wherein the fluid coupling comprises a stationary part and a movable part for a fluid connection, wherein both parts have a three-part valve for sealing said stationary and movable part against leakage, said three-part valve comprising a first member composed of two rings that are connected by elastic arms, a second member composed of a rod having different diameters on both ends and a third annular member, wherein at least two member of both parts comprise at least one sealing surface and one sealing lip that get in contact for preventing leakage.

The rod of the second member of the movable part may be surrounded by a round sealing surface having a cylinder projecting in direction of the first member for accommodating within the inner ring of the first member.

It is intended that the third annular member of the movable part comprises a sealing lip for attachment onto the sealing surface of the second member.

The third annular member of the stationary part may comprise a sealing surface and the first member of the stationary part may comprise a sealing lip for attachment onto the sealing surface of the third member of the stationary part to prevent leakage from the stationary part.

The valves of both parts can be arranged within a collar, wherein the outer surface of the collar of the movable part and the inner surface of the collar of the stationary part allow for a form-fitting insertion of the collar of the movable part into the collar of the stationary part.

It is envisaged that the rod of a valve is made of a rigid material. The sealing surfaces and sealing lips shall be made of a flexible material.

The first member of the stationary part may have a closed cylindrical protrusion for taking up one end of the second member.

The first member of the movable part can be arranged within a cap that is arranged within the collar of the movable part.

The collar of the stationary part may have means on its outer surface for fixation to ta ground plate of the automated analyzer system.

The stationary part may have further light sources for indicating whether a movable part is inserted or not.

A sensor for detecting a fluid connection between movable part and stationary part may also be part of the stationary part. The sensor can be a light barrier or a hall sensor, wherein the first or second member may comprise a magnetic part.

The collar of the stationary part can be made of a translucent material to transfer light.

The cap of the movable part can be a filter or a wire gauze.

It is within the scope of the invention that the movable part is a bottle, a container or a cartridge.

BRIEF DESCRIPTION OF THE FIGURES

The invention will now be described on the basis of the figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects and/or embodiments of the invention. For a more complete understanding of the present invention and the advantages thereof, reference is now made to the following description and the accompanying drawings, in which:

DETAILED DESCRIPTION OF THE INVENTION

The present disclosure provides a docking system for automated analyzer systems suitable to provide liquids to the system.

The new coupling comprises a movable part that is integrated into the bottom of the container or bottle and a stationary part that is fixed to the analyser system or a unit that can be attached to an analyser system. The movable part is self-aligning with the stationary part of the coupling in the analyser. An empty container can be detected without aspirating air if a fluid sensor will be arranged at the stationary part of the system.

A particle filter may be integrated into the coupling to prevent any particles like dust or debris to enter the analytical instrument.

Figure 1:
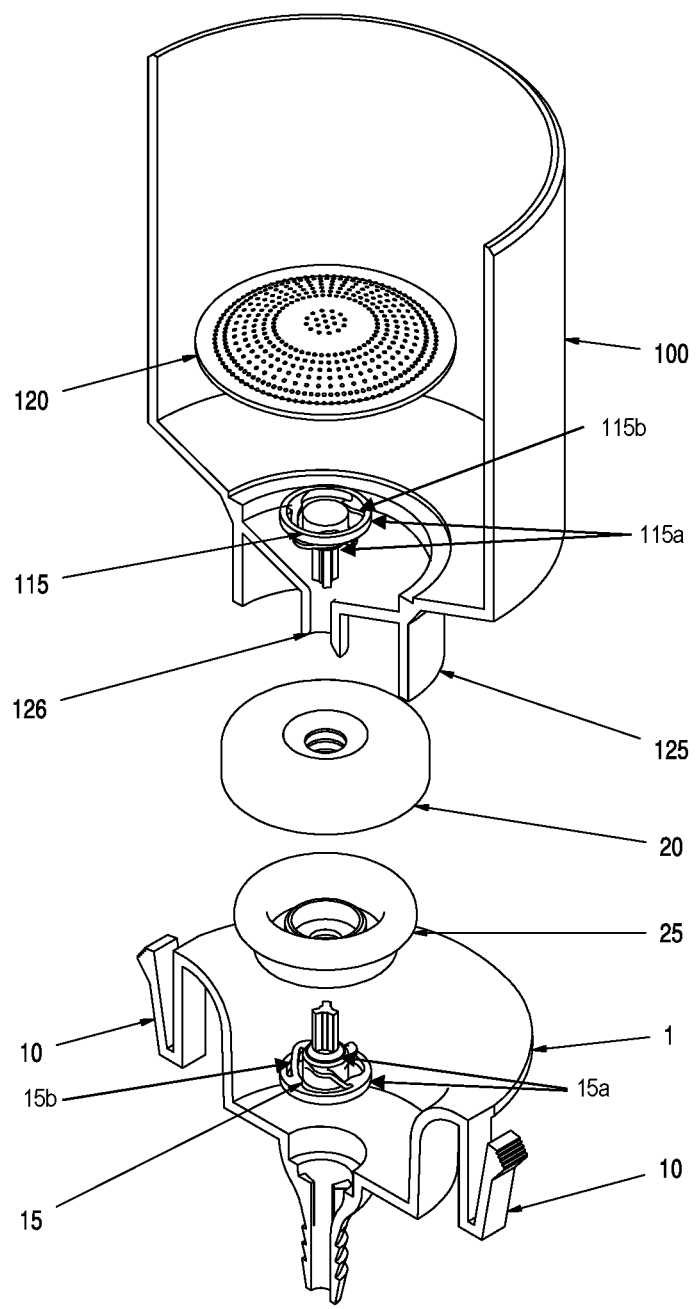
FIG. 1 is an exploded view of a first embodiment of a movable and stationary part of a docking system.

FIG. 1 shows a first embodiment of a docking system that consists of a stationary part 1, that can be fixed by snapping it with the snap-fits 10 into a surface, e.g. of an analyzer system. The movable part 100 shall be integrated into the bottom of a container, so that it can mate with the stationary part 1 for coupling. The stationary part 1 comprises two injection molded parts and two rubber components. The smaller and inner rubber part acts as a valve 15 and the outer round and grooved part acts as a gasket 20. The small molded part acts as a valve seat and gasket holder 25 that is fixed to the stationary part 1 after insertion of the rubber valve 15. It is fixed by either gluing or ultrasonic welding. The outer grooved gasket 20 is mounted after fixation of the valve seat and gasket holder 25.

FIG. 1 shows also the removable parts 100 that comprises a formed section of the container and a rubber part, that acts as a valve 115 and a cap 120, that seats the rubber part and acts as a filter. The small molded cap 120 is fixed to the container after mounting of the rubber valve 115. It is fixed by either gluing or ultrasonic welding.

Figure 2:
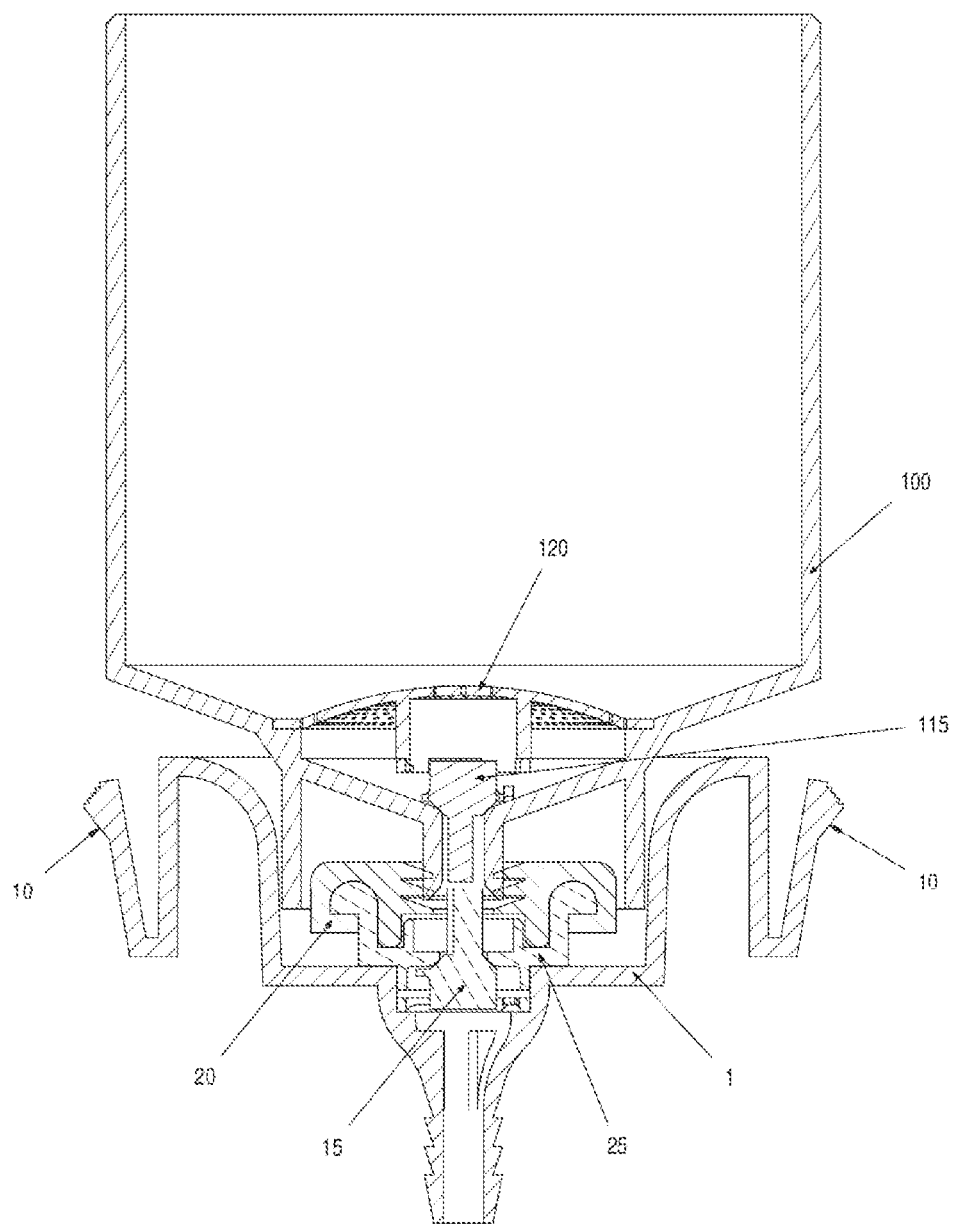
FIG. 2 is a sectional drawing of the first embodiment of both parts prior to valves getting in contact.

When the container is placed onto the coupling, the rounded shape of the stationary part 1 guides the spout 125 of the movable part 100 and the inner cylindrical part 126 of the spout 125 slides into the gasket 20 before any fluid transfer starts (comp. FIG. 2).

Figure 3:
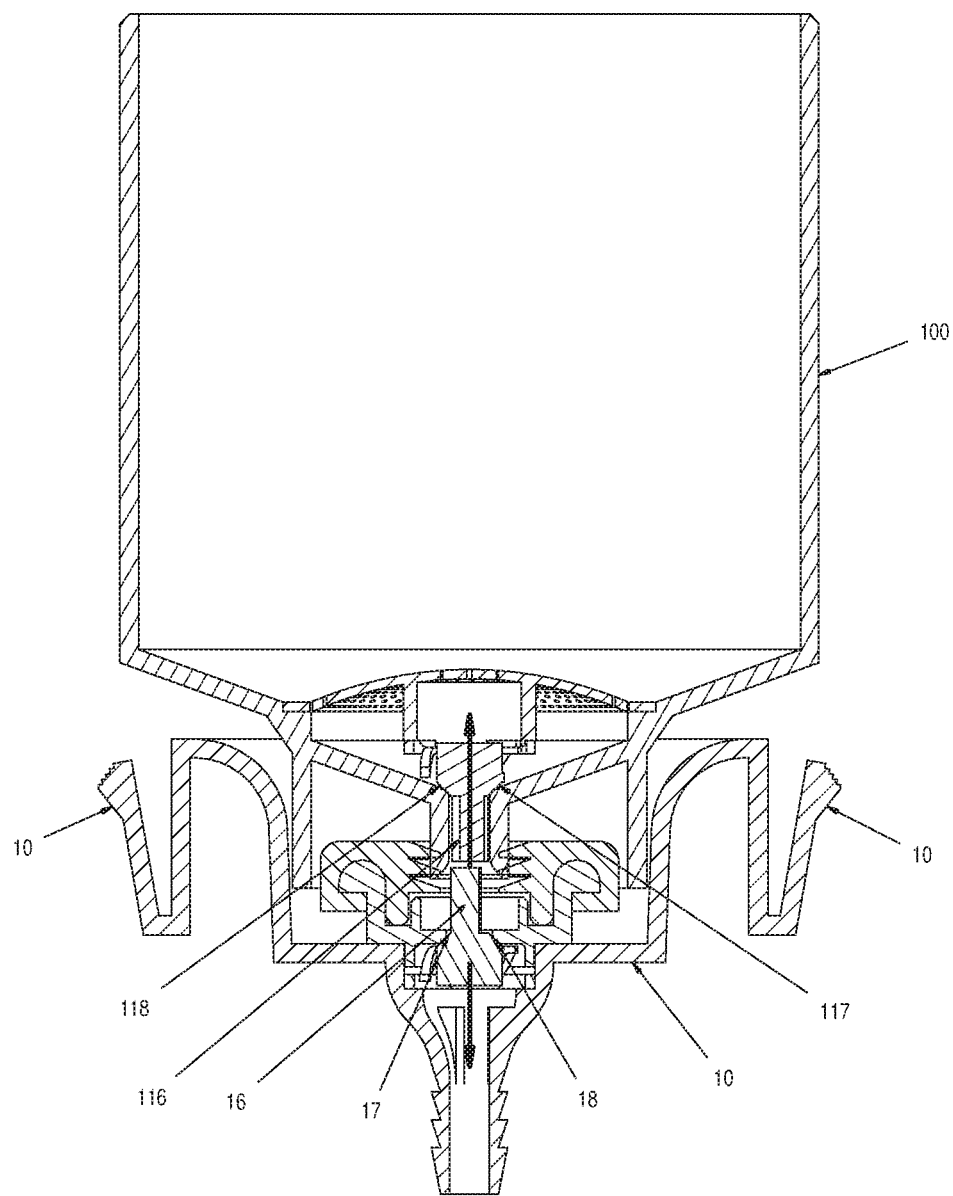
FIG. 3 is a sectional drawing of the first embodiment of a movable part indicating movement of valves when getting in contact with stationary part.

This initial contact ensures, that no liquid is spilled during coupling. When further inserted, the two rods 16, 116 of the rubber valves 15, 115 get into contact and the upper valve 115 of the movable part 100 will be pressed up whereas the lower valve 15 of the stationary part 1 will be pressed down (comp. FIG. 3). The arrows in FIG. 3 indicate the direction of movement of the two valves 15, 115. After such a movement, the fluid path is open, because the conical sealing 17, 117 of the rubber valves 15, 115 is moved out of the conical valve seating 18, 118.

The chosen geometry of the valves 15, 115 each having two rings 115a and flexible arms 115b causes the rubber material of the valves 15, 115 to be compressed during mounting, leading to a pretension on the valves 15, 115. Any fluid in the container will increase the sealing pressure of the valve 15, 115 in the container.

The stationary part 1 can be equipped with a tube fitting for further liquid transport into the instrument. A fluid sensor (not shown), i.e. an optical bubble sensor can be integrated right below the valve 115 in order to detect an empty container.

One advantage of the system of the instant disclosure is the ease of use. The integration of a liquid sensor at the coupling may further reduce the risk of air uptake into the liquid system leading to reduce priming efforts. The integrated filter makes additional inline filters in the tubing unnecessary and thus reduces the costs.

If the valve 15, 115 fails, a replacement is not very difficult: a new container would be needed and on the stationary side the snapped in part would have to be detached, the tubing removed and a new part connected to the tubing and inserted.

FIG. 2 shows a sectional view of the movable part 100 of the first embodiment prior to its valve 115 getting in contact with the valve 15 of the stationary part 1. Gasket 20 and valve seat and gasket holder 25 surround valve 15. The snap-fit 10 of stationary part 1 is depicted, which serves for fixation of the stationary part 1 to an analyser.

Figure 4:
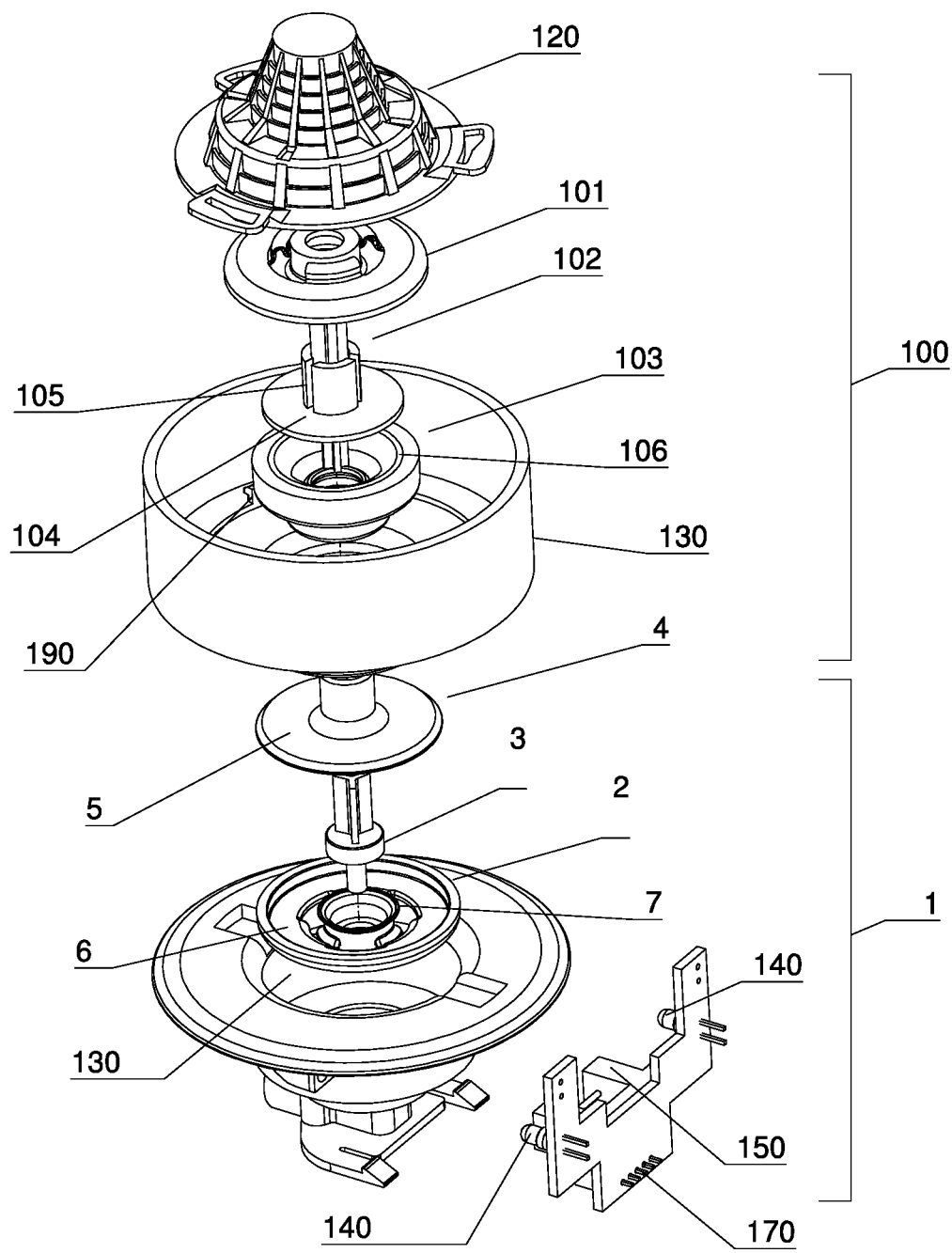
FIG. 4 is an exploded view of a second embodiment of a movable and stationary part of a fluid coupling.

FIG. 3 is a sectional drawing of the first embodiment of a movable part indicating movement of valves when getting in contact with stationary part. When rods 16, 116 get in contact by movement of stationary and movable part 1, 100 towards each other, the conical sealings 17, 117 are no longer in contact with conical valve seatings 18, 118 for sealing the outlet of movable and stationary part 1, 100. This, a fluid connection is established FIG. 4 shows an exploded view of a second embodiment of a movable and stationary part 1, 100 of a fluid coupling. The valve 115 of the movable part 100 is formed of several parts in comparison to the embodiment shown in FIG. 1. The first member of the movable part 101 represents the ring of valve 115 of the first embodiment that is elastically connected to the upper part of rod 116. Second member 102 of the movable part of the second embodiment represents rod 116 of the first embodiment. In addition the second member 102 comprises a round sealing surface 104 having a cylindrical projection. The cylindrical projection 105 is seated in the inner ring of first member 101.

The round sealing surface 104 of second member 102 seats solidly onto the sealing lip 106 of third member 103 of the movable part 100. A cap 120 is attached via mounting 190 of collar 130 to form a counter surface for the valve of the movable part 100.

The stationary part 1 comprises a first member 2 enclosing third member 4 with its outer part. Second member 3 corresponding to rod 16 of the valve 15 of the first embodiment shown in FIGS. 1 to 3 is arranged between first member 2 and third member 4.

The outer part of first member 2 of the stationary part encloses the edge 5 of third member 4 so that the flat surface of both member 2, 4 are in contact. The first member 2 has a sealing lip 7 that is in contact with the surface 5 of third member 4 in a closed state of the stationary part and thus sealing the movable part.

First member 2 is arranged in tight contact within the inner part of collar 130 of the stationary part 1. Since first member 2 is made of a flexible material it may be fixed in collar 130 by being arranged between the outer circumference of edge 5 of third member 4 and the inner surface of the collar. Detaching third member 4 may enable removing first member 2 from the collar 130.

FIG. 4 shows also electrical connection 170. Light barrier 150 may be used for determining the status of the movable being correctly inserted into the stationary part which is indicated by LED 140.

Figure 5:
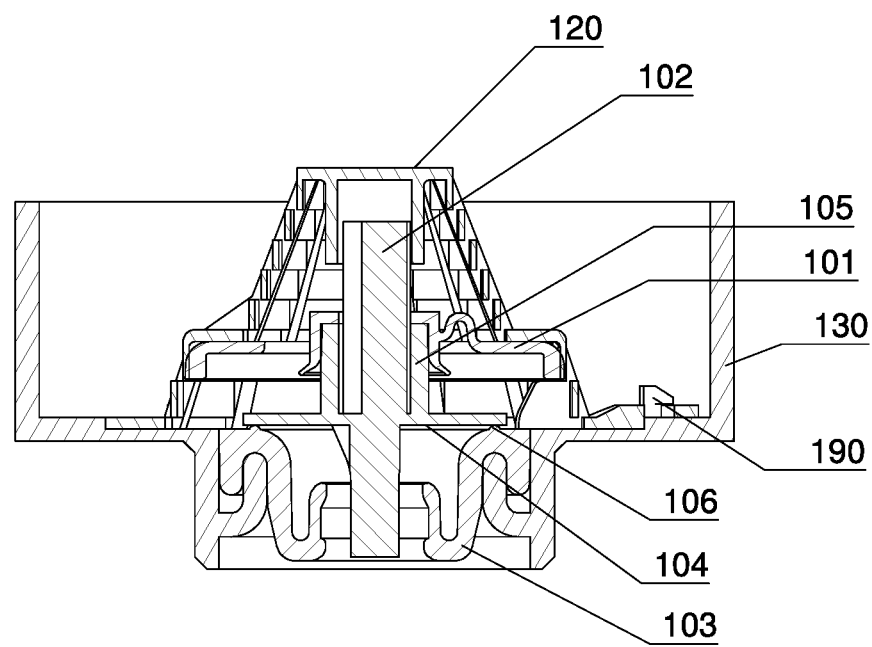
FIG. 5 is a sectional drawing of the second embodiment of a movable part prior to valves getting in contact.
Figure 5:
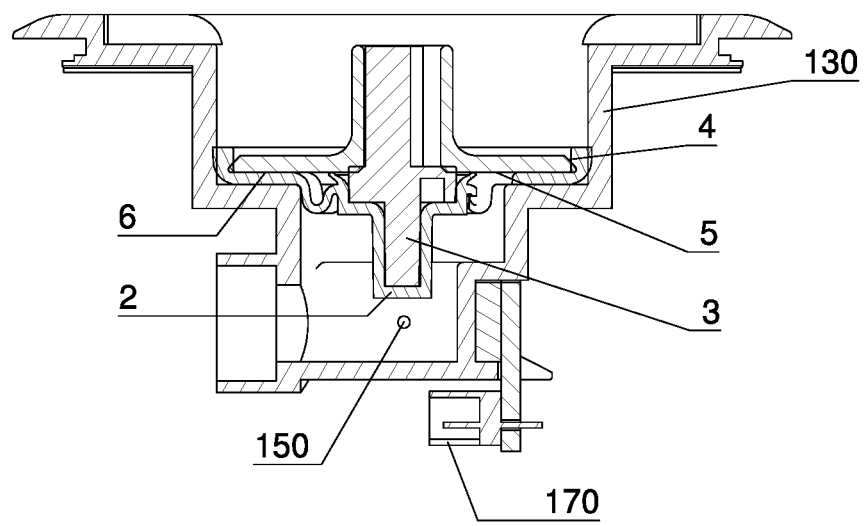

FIG. 5 shows a sectional drawing of the second embodiment of a movable part prior getting in contact with the stationary part. The interaction of first, second and third member 101, 102, 103 of the movable part can be taken from this figure. It is obvious that the round sealing surface 104 is part of the second member 102 and no separate part. The sealing lip 106 of the third member 103 interacts with sealing surface 104 to avoid any leakage from the movable part that can be a bottle or container. Cap 120 is fixed via mounting 190 of collar 130.

Electrical connection 170 is provided at the bottom of the stationary part. Light barrier 150 is used to detect a motion of the inner cylindrical part of the first member by a second member 2 being pushed downwards after getting in contact with second member 102 of the movable part for establishing a fluid connection.

Figure 6A:
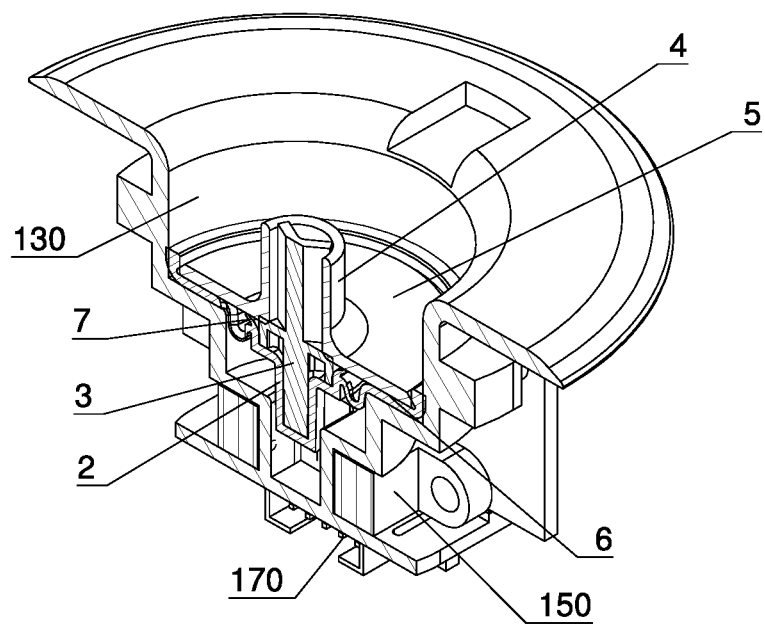
FIG. 6A is a top view on receiving part.

FIG. 6 shows in part A a top view of the receiving or stationary part and in B a bottom view of the receiving or stationary part. The arrangement of first, second and third member 2, 3, 4 of the stationary part can be seen, all three arranged in the inner side of collar 130. The contact of sealing surfaces 5 with sealing lip 7 seal the stationary part and prevent leakage of liquids. Light barrier 150 is used to detect whether a fluid connection is established or not. Electrical connection 170 is used for transmitting signals as well as for supplying power.

Figure 6B:
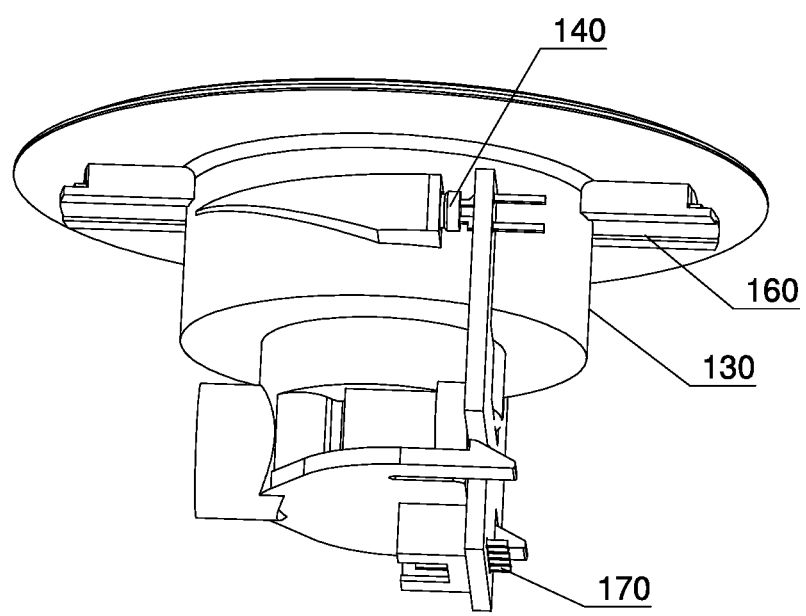
FIG. 6B is a bottom view on receiving part.

FIG. 6B shows a possible arrangement of LED 140. It is envisaged that the stationary part or at least the collar 130 is made of a transparent material so that is can be illuminated by LED 140, in particular in a colour indicating whether a fluid connection is established or not. Bayonet catch 160 is used to attach collar 130 of the stationary part to a unit or an analyser or a ground plate arranged within a unit or analyser. Electrical connection 170 is used for signal transmission of light barrier 150 or another sensor and for supplying power.

The first embodiment uses conical sealing and the second embodiment has laminar sealing surfaces.

Shape and material of the valve can be altered depending on the respective embodiment. The rod 15, 115 or the second member 3, 102 have to be made preferably of a solid material, whereas sealing surfaces or sealing lips 5, 6, 106 shall be made preferably of a elastically material.

The stationary part can be arranged within a ground plate, whereas the movable part is intended to part of a container or bottle that shall be connected with the stationary part.

The stationary part does not need to be clipped into place. It is obvious for a person ordinary skilled in the art that any other known mechanism for a fixed, but reversible attachment can also be used.

A further advantage of a system according to the instant disclosure is that the movable part can even be placed on a plane surface with its connecting part without any leakage of the liquid.

The invention is not limited to the use of a light barrier 150 for detecting the status of the fluid connection. It is obvious for a person having ordinary skill in the art that a Hall Sensor or a contact sensor may also be used. The skilled artisan is aware of the respective parts needed in using such alternatives.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS 1 stationary part
2 first member stationary part
3 second member stationary part
4 third member stationary part
5 surface third member stationary part
6 sealing surface first member stationary part
7 sealing lip
10 snap-fit
15, 115 valve
16, 116 rod
17, 117 conical sealing
18, 118 conical valve seating
20 gasket
25 valve seat and gasket holder
100 movable part
101 first member stationary movable part
102 second member stationary movable part
103 third member stationary movable part
104 round sealing surface second member movable part
105 cylindrical projection second member movable part
106 sealing lip third member movable part
120 cap
125 spout
126 inner cylindrical part of spout
130 collar
140 LED
150 light barrier
160 bayonet catch
170 electrical connection
190 mounting

What is claimed is:

1. A fluid coupling for automated analyzer systems suitable to provide liquids to the system, wherein the fluid coupling comprises:
   a stationary part; and
   a movable part for a fluid connection,
   wherein the stationary part and the moveable part each have a three-part valve for sealing said stationary part and said movable part against leakage, said three-part valve comprising:
   a first member composed of two rings that are connected by elastic arms;
   a second member composed of a rod having different diameters on both ends; and
   a third annular member;
   wherein at least two of said first, second and third member comprise at least one sealing surface and one sealing lip that interact to prevent leakage.

2. The fluid coupling of claim 1, wherein the rod of the second member of the movable part is surrounded by a round sealing surface having a cylinder projecting in direction of the first member for accommodating within the inner ring of the first member.

3. The fluid coupling of claim 2, wherein the third annular member of the movable part comprises a sealing lip for attachment onto the sealing surface of the second member.

4. The fluid coupling of claim 1, wherein the third annular member of the stationary part comprises a sealing surface.

5. The fluid coupling of claim 4, wherein first member of the stationary part comprises a sealing lip for attachment onto the sealing surface of the third member of the stationary part to prevent leakage from the stationary part.

6. The fluid coupling of claim 1, wherein the valve of the movable part is arranged in a collar of the movable part and the valve of the stationary part is arranged in a collar of the stationary part.

7. The fluid coupling of claim 1, wherein an outer surface of a collar of the movable part and an inner surface of a collar of the stationary part allow for a form-fitting insertion of the collar of the movable part into the collar of the stationary part.

8. The fluid coupling of claim 1, wherein the rod of a valve is made of a rigid material.

9. The fluid coupling of claim 1, wherein sealing surfaces and sealing lips are made of a flexible material.

10. The fluid coupling of claim 1, wherein the first member of the stationary part has a closed cylindrical protrusion for taking up one end of the second member.

11. The fluid coupling of claim 1, wherein the first member of the movable part is arranged within a cap of the movable part that is arranged within a collar of the movable part.

12. The fluid coupling of claim 1, wherein a collar of the stationary part is fixed to a ground plate of the automated analyzer system.

13. The fluid coupling of claim 1, wherein the stationary part has light sources for indicating whether a movable part is inserted.

14. The fluid coupling of claim 1, wherein the stationary part has a sensor for detecting a fluid connection between movable part and stationary part.

15. The fluid coupling of claim 14, wherein the sensor is a light barrier or a hall sensor, wherein the first or second member comprises a magnetic part.

16. The fluid coupling of claim 1, wherein a collar of the stationary part is made of a translucent material.

17. The fluid coupling of claim 1, wherein the cap of the movable part is a filter or a wire gauze.

18. The fluid coupling of claim 1, wherein the movable part is a bottle, a container or a cartridge.

* * * * *